HYBRID PREAMPLIFIER FOR THERMISTOR BOLOMETER INFRARED DETECTORS
Filed July 17, 1964
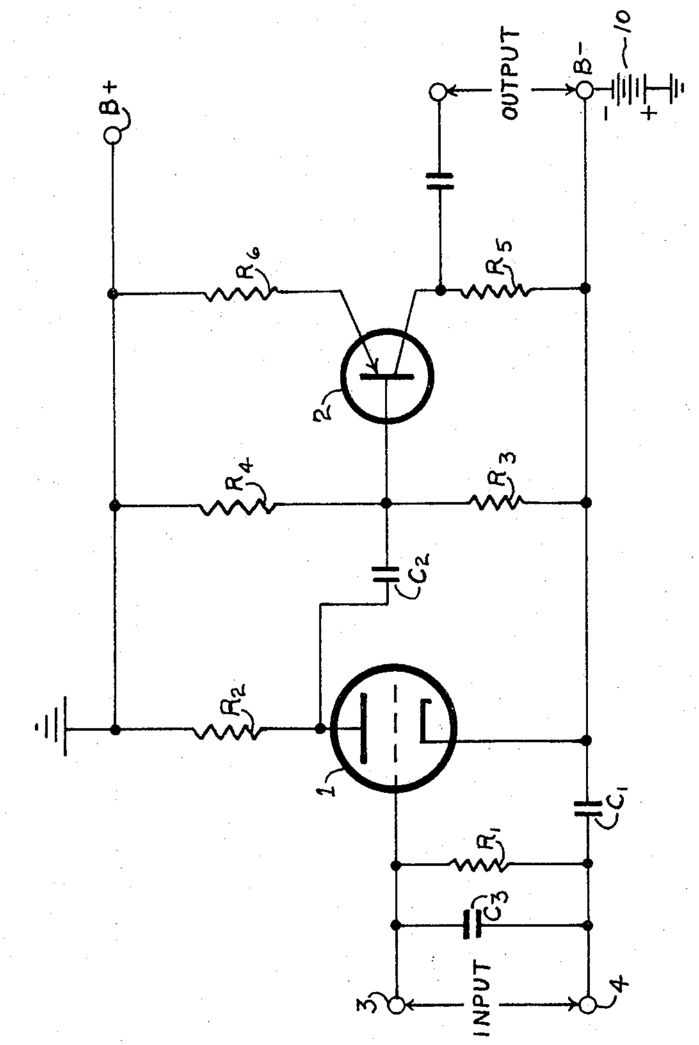
INVENTOR.
HUGH R. CARLON
BY Harry M. Saragovitz,
Edward J. Kelly & Herbert Berl
ATTORNEYS

3,353,109
HYBRID PREAMPLIFIER FOR THERMISTOR BOLOMETER INFRARED DETECTORS

Hugh R. Carlon, Edgewood, Md., assignor to the United States of America as represented by the Secretary of the Army Filed July 17, 1964, Ser. No. 384,052
1 Claim. (Cl. 330—3)

ABSTRACT OF THE DISCLOSURE

A hybrid preamplifier for thermistor bolometer infrared detectors wherein the low magnitude signal of the detector is coupled to a high impedance, floating input of an electron tube amplifier having an anode resistor which is coupled to the input of a transistor amplifier and matches the impedance thereof, providing maximum signal transfer from the anode resistor to the transistor amplifier with but a small signal noise content and band-pass means for excluding noise signals above and below the frequency of the low magnitude signal.

The invention described herein may be manufactured and used by or for the Government of the United States of America for governmental purposes without the payment to me of any royalty thereon.

This invention relates to a hybrid preamplifier. More specifically, it relates to a preamplifier utilizing a single triode input stage followed by one or more transistor stages.

The problem of amplifying weak signals on the order of one microvolt or less presents many difficulties. This is especially so where the signal to noise ratio is important and where power consumption and space occupied by the system must be held toa minimum.

The present circuit was developed to amplify the weak signals from a thermistor bolometer infrared detector, but it would be equally applicable wherever very weak high-impedance signals are dealt with, where noise levels are stringent, where apparatus must be miniaturized and power consumption kept at a low level.

The latter requirement prevents the use of a series of vacuum tubes and the low signal to noise level requirement makes it difficult to utilize an all transistor circuit. The latter circuit presents an additional problem where high input impedance is a requirement. Such a high input impedance cannot be obtained in transistor circuitry except with the use of a first stage configuration which gives considerably less than unity voltage gain. The additional stages required to recover the gain lost on this account have a deleterious effect on the signal to noise level necessitating further expedients such as negative feedback loops. This fact makes the mere addition of transistor stages, to a degree, self defeating and may result in a power requirement equal to that of a miniature triode. To avoid this dilemma, the present circuit was designed using a single triode (Nuvistor 7586) for feeding the signal into an amplifier utilizing PNP transistors such as 2N175. The novel feature in this circuit is the fact that the triode is inverted or positioned "upside down" in the circuit with the result that the anode resistor is grounded while the cathode is at a negative potential equal to that of the transistor voltage supply. This voltage supply is found to be adequate for high gain since the chosen Nuvistor No. 7586 can operate to amplify very small signals from very low voltage supplied. The input impedance of such a tube is high, matching the high impedance of the detector, and the tube also has high gain and provides a good signal to the transistor stage with excellent signal to noise characteristics.

The schematic diagram of the invention is shown in the sole figure of the drawing wherein 1 represents the Nuvistor triode, $R_1$ is the grid resistor and $R_2$ the anode resistor of this tube. Since the tube must feed a PNP transistor, the signal amplified by triode 1 is taken across $R_2$ instead of across the tube as in ordinary circuits, and is applied to the base-emitter input of transistor 2 across resistor $R_4$ of the voltage divider $R_4$—$R_3$. A DC blocking capacitor $C_2$ connected between the anode of triode 1 and the base of transistor 2 functions as a band pass element of the amplifier, its capacitance value selected so that it is small at low audio frequencies whereby low frequency noise signals are not effectively transferred to the input of transistor 2. In addition, the values of plate load resistor $R_2$ is selected so that it matches the input impedance of the transistor amplifier whereby maximum transfer of the amplified signal of triode 1 is applied to the input of the transistor amplifier wherein the low noise PNP transistor 2 (2N175) is now acceptable for the job since the signal amplitude is now sufficiently large to override any noise from this device.

Because the signal is taken from the anode resistor $R_2$, the latter is made small enough to match the 2N175 input directly. The tube 1 (Nuvistor No. 7586) can operate from the low B— voltage supply 10 within its linear characteristics, even for rather low values of $R_2$. The tube 1 has high input impedance and is properly matched to the transistor 2 as indicated. This results in high gain and high signal to noise ratio. The grid input of tube 1 matches the input impedance of the detector through the proper choice of $R_1$ and said grid is free to float at the B— potential, or it may be further isolated from ground by the insertion of a coupling capacitor between the tube cathode and the B— side of $R_1$ as shown at $C_1$. $C_3$ is a high frequency shunting capacitor connected across the input terminal 3 and 4 of the amplifier and comprises another element of the band pass of the amplifier for the purpose of shunting the high frequency noise signals from the bolometer detector to the ground. The base of transistor 2 is connected to the positive and negative terminals of the voltage supply 10 by voltage divider resistors $R_4$ and $R_3$, respectively. The collector and emitter terminals of said transistor are also connected to said negative and said positive terminals of said voltage supply by means of resistors $R_5$ and $R_6$, respectively. Additional transistor stages may be added as the gain requirements demand. The output signal of the amplifier is taken across collector resistor 5 which has one terminal connected to the collector of transistor 2 and to the output terminal through capacitor 7 and another terminal connected to output terminal 9. The unique "inverted" circuit arrangement for tube 1 is required only in the first or input stage.

I claim:

A high gain, low noise preamplifier for amplifying signals of thermistor bolometer infrared detectors to the exclusion of noise signals having a higher or lower frequency than the frequency of said detector signal frequency comprising in combination, an electron tube amplifier of the common-cathode configuration having a grid, anode and cathode elements, a high impedance floating input means for coupling said detector signals to said electron tube amplifier whereby ground loop currents are not applied to the input of said electron tube consisting of a first terminal connected to said grid, a second terminal connected through a capacitor to said cathode and a grid resistor connected between said grid and said capacitor, a direct-current potential source having a positive pole connected to ground and a negative pole connected to said cathode, an anode resistor coupling said anode to said positive pole, a transistor amplifier comprising a transistor having a collector electrode, a base electrode and an emitter electrode, a collector resistance means connecting the collector electrode of said transistor to said negative pole, emitter resistance means connecting the emitter electrode to said positive pole, a voltage divider comprising a first resistor and a second resistor series connected across said positive and negative poles, said first resistor connected between said base electrode and said positive pole and said second resistor connected between said base and said negative pole, a first capacitor coupling said anode and said base electrode, the output signal of said electron tube amplifier developed across said anode resistor and applied to the input of said transistor amplifier through said ground and said first capacitor, the resistance value of said anode resistor selected to match the input impedance of said transistor amplifier whereby maximum signal transfer from the electron tube amplifier to the transistor amplifier is obtained, band-pass means comprising said first capacitor having a small capacitance value at low audio frequencies whereby the low frequency noise signals from the bolometer detector are not coupled to the transistor amplifier input and a second capacitor connected across said first and second terminals whereby high frequency noise signals from the bolometer detector are shunted to ground, and signal output coupling means consisting of a first output terminal connected to one end of said collector resistance means through a capacitor and a second output terminal connected to the opposite end of said collector resistance means.

References Cited

UNITED STATES PATENTS

| | | | |
|---|---|---|---|
| 3,015,070 | 12/1961 | Erath | 330—3 |
| 3,020,486 | 2/1962 | Milford | 330—3 |

ROY LAKE, *Primary Examiner.*

N. KAUFMAN, *Assistant Examiner.*